United States Patent [19]

Hida et al.

[11] Patent Number: 5,100,993
[45] Date of Patent: Mar. 31, 1992

[54] UV CURABLE COMPOSITIONS OF ORGANOPOLYSILOXANE CONTAINING MERCAPTOALKYL AND PHENYLENE GROUPS

[75] Inventors: Yoshinori Hida, Kawasaki; Shohei Kozakai, Annaka; Seizi Katayama, Annaka; Hiroshi Kanbara, Annaka, all of Japan

[73] Assignee: Shin-Etsu Chemical Co., Ltd., Tokyo, Japan

[21] Appl. No.: 463,306

[22] Filed: Jan. 10, 1990

[30] Foreign Application Priority Data

Jan. 27, 1989 [JP] Japan ................ 1-18331
Jan. 31, 1989 [JP] Japan ................ 1-22395

[51] Int. Cl.⁵ .............. C08G 77/20; C08G 77/28; C08L 83/07; C08L 83/08
[52] U.S. Cl. .................... 528/30; 528/32; 528/43; 522/99; 522/172
[58] Field of Search .............. 528/30, 32, 43; 522/99, 522/172

[56] References Cited

U.S. PATENT DOCUMENTS

| | | | |
|---|---|---|---|
| 4,238,393 | 12/1980 | Takamizawa et al. | 528/30 |
| 4,596,720 | 6/1986 | Keryk et al. | 528/30 |
| 4,861,807 | 8/1989 | Preiner et al. | 528/30 |
| 4,935,455 | 6/1990 | Huy et al. | 522/99 |

*Primary Examiner*—Marion E. McCamish
*Assistant Examiner*—Susan Berman
*Attorney, Agent, or Firm*—Birch, Stewart, Kolasch & Birch

[57] ABSTRACT

A UV curable composition of a specific organopolysiloxane having mercaptoalkyl and phenylene groups and a vinyl-containing organopolysiloxane cures into a film which emits little stimulative sulfur odor and has enough resistance to light or UV radiation to retain its as-cured properties even after long-term exposure to sunlight or UV radiation.

7 Claims, No Drawings

UV CURABLE COMPOSITIONS OF ORGANOPOLYSILOXANE CONTAINING MERCAPTOALKYL AND PHENYLENE GROUPS

This invention relates to ultraviolet (UV) curable organopolysiloxane compositions.

BACKGROUND OF THE INVENTION

UV curable organopolysiloxane compositions are well known in the art, for example, compositions predominantly comprising an organopolysiloxane having an aliphatic unsaturated radical (e.g., vinyl) attached to a silicon atom in its molecule and another organopolysiloxane having an organic radical containing a mercaptoalkyl (e.g., mercapto-propyl) radical attached to a silicon atom. These compositions are curable by exposure to UV radiation through addition reaction between the unsaturated radical and the mercapto radical. They are useful in a variety of applications including coating compositions for fiber optics.

The mercaptoalkyl radical-containing siloxane compositions, however, are less desirable from hygienic and working aspects partially because the inclusion of low-boiling components in the mercapto functional component causes the compositions to emit a highly stimulative sulfur odor inherent to the mercapto radical.

The organopolysiloxane compositions mentioned above have many working benefits including quick curing, one-part type without a need for catalyst mixing, and a sufficient working life. However, for example, a composition containing an organopolysiloxane in which the aliphatic unsaturated radical attached to a silicon atom is a vinyl or allyl radical and another organopolysiloxane in which the mercapto-containing organic radical attached to a silicon atom is a mercaptopropyl radical has a drawback that if the composition cured by UV exposure is allowed to stand under sunlight or UV radiation for a long time, the siloxane gradually degrades to such an extent that the cured product may eventually lose its original shape. This is a critical drawback for organopolysiloxane compositions of the mercaptoalkyl-vinyl (or allyl) addition reaction type, particularly when the above-mentioned organopolysiloxane composition once cured is used in an environment exposed to sunlight or UV radiation, for example, as a coating composition for fiber optics, an adhesive for glass lenses, and a coating composition for glass sleeves.

SUMMARY OF THE INVENTION

Therefore, a primary object of the present invention is to provide a novel and improved mercapto-containing organo-polysiloxane composition which emits a minimized stimulative sulfur odor and is readily UV curable into a resinous or rubbery product.

Another object of the present invention is to provide a novel and improved UV-curable organopolysiloxane composition having improved light resistance which ensures that a cured product thereof does not degrade, but remains intact from an as-cured state under exposure to sunlight or UV radiation for a long time.

According to the present invention, there is provided an organopolysiloxane composition comprising (A) an organopolysiloxane having per molecule at least two units of the general formula:

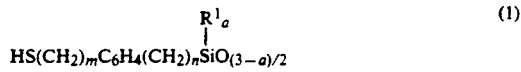

wherein $R^1$ is a monovalent organic radical having 1 to 6 carbon atoms without an aliphatic unsaturated bond, letter a is a number selected from the group consisting of 0, 1 and 2, m is a number selected from the group consisting of 1, 2 and 3, and n is a number selected from the group consisting of 0, 1 and 2, and (B) an organopolysiloxane having per molecule at least two units of the general formula:

wherein $R^2$ is a monovalent organic radical having 2 to 10 carbon atoms and containing an aliphatic unsaturated bond, $R^3$ is a monovalent organic radical having 1 to 7 carbon atoms without an aliphatic unsaturated bond, letter b is a number selected from the group consisting of 1, 2 and 3, and c is a number selected from the group consisting of 0, 1 and 2, with the sum of b and c being equal to 1, 2 or 3.

As compared with prior art mercaptoalkyl radical-containing siloxane compositions, the UV curable organopolysiloxane composition of the invention produces a minimized stimulative sulfur odor due to the mercapto radical and thus provides great improvements in working and hygienic aspects because it contains a mercapto functional component in the form of a substituent having phenylene and mercapto radicals. Because of inclusion of a phenylene radical, the composition of the invention can be cured into a product having good heat resistance and improved adherence or wettability to an underlying substrate.

When component (B) is an organopolysiloxane having at least two radicals:

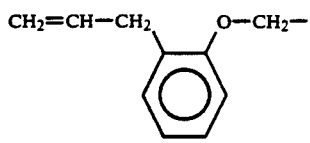

attached to silicon atoms per molecule, there is obtained a UV curable organopolysiloxane composition capable of forming a cured product having improved radiation resistance in that it undergoes little degradation of the siloxane upon extended exposure to sunlight or UV radiation, that is, experiences minimized deterioration with time.

DESCRIPTION OF THE INVENTION

Briefly stated, the composition of the invention is comprised of organopolysiloxanes (A) and (B). Component (A) is an organopolysiloxane having at least two units of the general formula:

$$HS(CH_2)_mC_6H_4(CH_2)_nSiO_{(3-a)/2} \overset{R^1_a}{|} \quad (1)$$

per molecule. In formula (1), $R^1$ is a monovalent organic radical having 1 to 6 carbon atoms without an aliphatic unsaturated bond, for example, lower alkyl radicals such as methyl, ethyl and butyl radicals, cycloalkyl radicals such as a cyclohexyl radical, a phenyl radical, and lower alkoxy radicals such as methoxy, ethoxy and butoxy radicals. Letter a is a number equal to 0, 1 or 2, m is a number equal to 1, 2 or 3, and n is a number equal to 0, 1 or 2.

The substituent other than $R^1$ in the unit of formula (1) containing mercapto and phenylene radicals, represented by $HS(CH_2)_mC_6H_4(CH_2)_n$, includes the following examples, $HSCH_2C_6H_4(CH_2)_2—$, $HS(CH_2)_2C_6H_4(CH_2)_2—$, $HSCH_2C_6H_4—$, $HS(CH_2)_3C_6H_4—$, $HSCH_2C_6H_4CH_2—$, etc.

Component (A) may be a homopolymer consisting of the mercapto radical-containing siloxane units of formula (1), an oligomer containing a cyclic siloxane, more illustratively a cyclic oligomer of the formula:

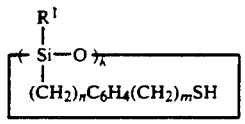

wherein m and n are as defined above, and k is an integer of 3 to 10, or a copolymer thereof with a mercapto radical-free unit or units. The unit which can constitute component (A) with the unit of formula (1) in the latter case is preferably a unit having the general formula:

$$R^4_dSiO_{(4-d)/2} \quad (3)$$

wherein $R^4$ is a monovalent hydrocarbon radical having 1 to 6 carbon atoms without an aliphatic unsaturated bond, and letter d is a number equal to 0, 1, 2 or 3. Examples of the radical represented by $R^4$ include lower alkyl radicals such as methyl, ethyl and butyl radicals, cycloalkyl radicals such as a cyclohexyl radical, and a phenyl radical.

Preferably, the organic radical in component (A) other than the mercapto radical-containing substituent is a methyl radical. Desirable results are obtained when there is present at least 50 mol %, especially at least 80 mol % of methyl based on the sum of $R^1$ and $R^4$.

In turn, the mercapto radical-containing substituents $HS(CH_2)_mC_6H_4(CH_2)_n$ in component (A) may be present at any positions in the molecule including molecular chain ends, intermediate or branched points in the backbone of a linear molecule. Preferably there are contained at least 3 mercapto radical-containing substituents in component (A). The mercapto radical-containing substituents should preferably be present in an amount of 3 to 25 mol %, more preferably 5 to 15 mol% of the entire organic substituents of component (A).

The degree of polymerization of the siloxane of component (A) is not critical to the invention and may be chosen from a wide range covering from a low viscosity oil to a high molecular weight resinous solid although the preferred degree of polymerization is in the range of from 2 to 10,000, more preferably from 4 to 1,000.

Some illustrative, but non-limiting, examples of component (A) are given below.

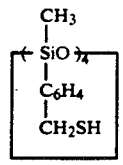

$(HSCH_2C_6H_4(CH_2)_2SiO_{3/2})_p(C_6H_5SiO_{3/2})_q((CH_3)_2SiO_{2/2})_r$
p:q:r = 1:1:1

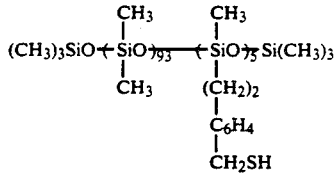

In the practice of the invention, component (A) may be used alone or in admixture of two or more.

The organopolysiloxane which is component (A) of the composition of the invention may be readily prepared by any well-known method, for example, hydrolysis of a starting organosilane and equilibration reaction of a low molecular weight cyclic siloxane in the presence of an acid or base catalyst.

Component (B) is an organopolysiloxane having at least two units of the general formula:

$$R^2_bR^3_cSiO_{(4-b-c)/2} \quad (2)$$

per molecule. In formula (2), $R^2$ is a monovalent organic radical having 2 to 10 carbon-atoms with an aliphatic unsaturated bond, for example, vinyl, allyl, 3-butenyl, 5-hexenyl, and

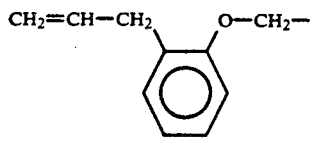

radicals. $R^3$ is a monovalent organic radical having 1 to 7 carbon atoms without an aliphatic unsaturated bond. Examples of the radical represented by $R^3$ include lower alkyl, lower alkoxy, cycloalkyl and phenyl radicals as previously described for $R^1$ of formula (1). Letter b is a number equal to 1, 2 or 3, c is a number equal to 0, 1 or 2, and the sum of b and c is equal to 1, 2 or 3.

Component (B) may be a homopolymer consisting of the aliphatic unsaturated bond-containing siloxane units of formula (2), an oligomer containing a cyclic siloxane, more illustratively a cyclic oligomer of the formula:

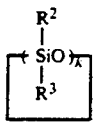

wherein $R^2$ and $R^3$ are as defined above, and k is an integer of 3 to 10, or a copolymer thereof with an aliphatic unsaturated bond-free unit or units.

The aliphatic unsaturated bond-free unit which can constitute component (B) with the unit of formula (2) in the latter case is preferably a unit having the general formula:

$$R^5{}_eSiO_{(4-e)/2} \qquad (4)$$

wherein $R^5$ is a monovalent hydrocarbon radical having 1 to 6 carbon atoms without an aliphatic unsaturated bond, and letter e is a number equal to 0, 1, 2 or 3. Examples of the radical represented by $R^5$ include lower alkyl, cycloalkyl, and phenyl radicals as previously described for $R^4$ of formula (3).

Preferably, the organic radical in component (B) other than $R^2$ is a methyl radical. Better results are obtained when there is present at least 50 mol %, more preferably at least 75 mol % of methyl based on the sum of $R^3$ and $R^5$.

$R^2$ radicals may be present at any positions in the molecule including molecular chain ends, intermediate or branched points in the backbone of a linear molecule insofar as there are contained at least 2, preferably 2 to 10 $R^2$ radicals per molecule. In order for the composition of the invention to cure into a product having an increased hardness, $R^2$ radicals are preferably positioned at molecular chain ends. The content of $R^2$ is preferably in the range of from 0.2 to 0.002 mol %, more preferably from 0.1 to 0.005 mol % based on the total substituents in component (B).

The degree of polymerization of the siloxane of component (B) is not critical to the invention and may be chosen from a wide range covering from a low viscosity oil to a high molecular weight resinous solid although the preferred degree of polymerization is in the range of from 2 to 10,000, more preferably from 3 to 1,000.

Some illustrative, but non-limiting, examples of component (B) are given below. In the following examples, all letters s, t, u, v, w, x and y are integers.

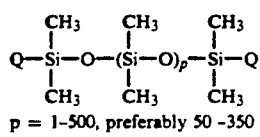

p = 1-500, preferably 50-350

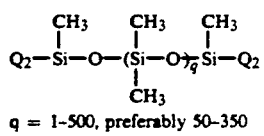

q = 1-500, preferably 50-350

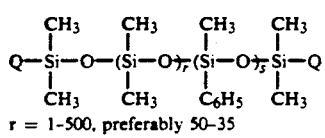

r = 1-500, preferably 50-35
s = 0-500, preferably 2-20

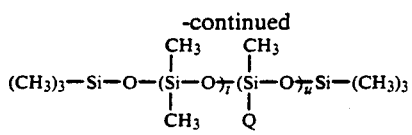

t = 5-500, preferably 10-350
u = 2-25, preferably 3-15

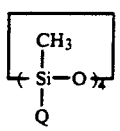

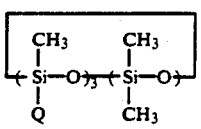

In a preferred embodiment, component (B) is an organo-polysiloxane having at least two radicals:

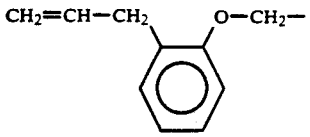

attached to silicon atoms per molecule. Then there is available a UV curable organopolysiloxane composition capable of forming a cured product having improved radiation resistance and hence experiencing minimized degradation upon extended exposure to light and UV radiation. This cured product will find a wide variety of applications as a coating composition for fiber optics, an adhesive for glass lenses, and a coating composition for glass sleeves.

The preferred organopolysiloxane having at least two radicals:

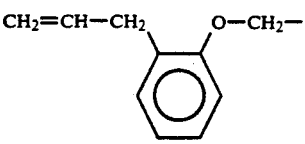

(often referred to as Q radicals, hereinafter) attached to silicon atoms per molecule is an organopolysiloxane having at least one siloxane bond (≡Si—O—Si≡) and at least two Q radicals directly attached to silicon atoms per molecule, which is an organopolysiloxane of formula (2) wherein $R^2$ is a Q radical.

The remaining organic radicals ($R^3$ in formula (2)) in the molecule other than Q radicals include organic radicals having 1 to 7 carbon atoms, for example, alkyl radicals such as methyl, ethyl and propyl radicals, aryl radicals such as phenyl and tolyl radicals, cycloalkyl radicals such as cyclohexyl and cyclobutyl radicals, and substituted ones of these hydrocarbon radicals in which some hydrogen atoms attached to carbon atoms are replaced by halogen atoms, cyano radicals or mercapto radicals. They may be present as a combination of two or more of the same or different types.

The organopolysiloxane used herein may be any of straight chain, branched, network, and cyclic types.

Examples of the organopolysiloxane or component (B) are shown by the following organopolysiloxanes of formulae (5) to (10). In the following examples, all letters p, q, r, s, t, and u are positive integers and Q is $CH_2=CH-CH_2-(ortho-C_6H_4)-CH_2-$.

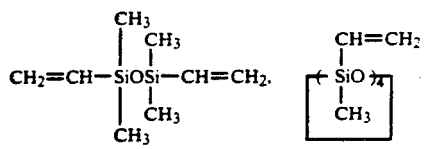

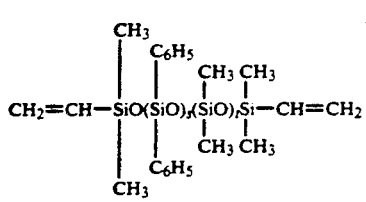

s = 0-500, preferably 0-150
t = 1-500, preferably 50-350

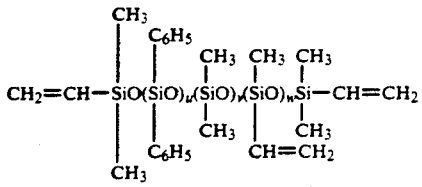

u = 0-500, preferably 0-150
v = 1-500, preferably 50-350
w = 1-50, preferably 1-10

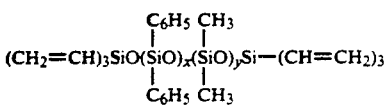

x = 0-500, preferably 0-150
y = 1-500, preferably 80-400

These organopolysiloxanes may be readily prepared, for example, by mixing corresponding organosilanes followed by co-hydrolysis or by effecting equilibrium reaction between a disiloxane containing the relevant terminal radical and a cyclic polysiloxane in the presence of an alkali catalyst.

In the practice of the invention, component (B) may be used alone or in admixture of two or more.

Although the composition of the invention contains components (A) and (B) defined above as the organopoly. Q siloxanes, component (C) having both at least two Q radicals attached to silicon atoms and at least two mercapto-containing organic radicals attached to silicon atoms per molecule may be blended instead of components (A) and (B).

The composition of the invention is readily converted into a cured product by uniformly mixing appropriate amounts of components (A) and (B) and exposing the mixture to UV radiation. The mixing proportion of the mercapto radical in component (A) to the aliphatic unsaturated bond in component (B) is not critical. Cured products show better properties when the proportion is in such a range that there are available 0.5 to 5, mcre preferably 0.8 to 3 mercapto radicals in component (A) per aliphatic unsaturated bond in component (B).

When the composition of the invention is cured by mixing components (A) and (B) as defined above and exposing the mixture to UV radiation, it is generally recommended to add a well-known photopolymerization initiator to promote and facilitate the curing step. Examples of the photopolymerization initiator include organic peroxides such as benzoyl peroxide, t-butyl perbenzoate, dicumyl peroxide, and t-butyl peroxide; aromatic ketones such as acetophenone, diethoxyacetophenone, benzophenone, benzoin ether thioxane, benzoin ethyl ether, benzoin isopropyl ether, and benzoin isobutyl ether; and azo compounds such as azobisisobutyro. nitrile. The amount of the photopolymerization initiator added may be similar to the amount of a photopolymerization initiator added to conventional photocurable resin compositions, more particularly in the range of 0 to 10% by weight based on the total weight of components (A) and (B).

The UV radiation used in curing the composition of the invention may be radiation having a wavelength within the range of from 200 to 450 μm as emitted by high-pressure mercury lamps, low-pressure mercury lamps, metal halide lamps, xenon lamps, and hydrogen discharge lamps. Sunlight is also effective for the composition to undergo cross. linking. The time and atmosphere for exposure to UV radiation may be appropriately selected depending on a curing rate, a film thickness, and a particular UV radiation source used. The curing atmosphere may be air, inert gases or the like.

The composition of the invention may be used in any desired state covering a wide range of viscosity from a low viscosity oily state to a resinous solid. When the composition is a high viscosity fluid or resinous solid, any desired organic solvent may be added for dilution. When the composition is a low viscosity oil in the temperature range of from room temperature to about 70° C., it may be used without a solvent.

The composition of the invention may contain any desired additive selected from anti-oxidants, anti-aging agents, dyes and pigments in amounts not to substantially interfere the curing reaction by UV radiation, and if desired, inorganic fillers such as fumed silica, precipitated silica, ground quartz, and calcium carbonate.

The UV curable organopolysiloxane compositions of the present invention are useful in a variety of applications including primary coating compositions for optical transmission fibers, mold release agents, and various other coating compositions.

EXAMPLE

Examples of the present invention are given below by way of illustration and not by way of limitation. All parts and percents are by weight unless otherwise stated.

EXAMPLE 1

A reactor having a volume of 200 ml and equipped with a stirrer, a reflux condenser, and a dropping funnel was charged with 15 grams of conc. hydrochloric acid and 25 grams of water. To the reactor was added dropwise 50 grams of a 40% toluene solution of an organosilane of the following structural formula.

$HSCH_2C_6H_4CH_2CH_2SiCH_3(OC_2H_5)_2$

After exothermic reaction ceased, the reaction solution was heated under reflux for 4 hours. The reaction solution separated into two layers, an upper layer of organic phase and a lower layer of aqueous phase. The lower layer was extracted with toluene. The upper organic layer was combined with the toluene extract and washed with water until neutral. The organic layer was azeotropically dewatered with toluene and vacuum stripped of the solvent and the like at 150° C./1 mmHg. After filtration, there was obtained a mercapto radical-containing organosiloxane oligomer.

A reactor having a volume of 100 ml was charged with 8.4 grams of the mercapto radical-containing organosiloxane oligomer, 55 grams of octamethylcyclotetrasiloxane, and 1.3 grams of hexamethyldisiloxane. Then 0.1 gram of trifluoro. methanesulfonic acid was added to the reactor under a nitrogen atmosphere. Heating at 80° C. for 24 hours with stirring turned the reaction solution substantially clear. The solution was cooled down to room temperature, combined with 0.2 grams of 28% aqueous ammonia and stripped of low-boiling fractions at 180° C./1 mmHg. After filtration, there was obtained an organopolysiloxane (I) having the following average formula.

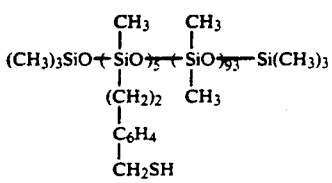

To 18 parts of organopolysiloxane (I) was evenly added 51 parts of organopolysiloxane (II) having the following average formula.

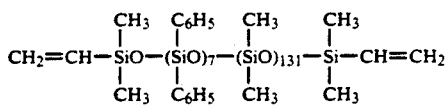

After 1 part of 2-hydroxy-2-methyl-1-phenylpropan-1-ol was added to the mixture as a photopolymerization initiator, the mixture was thoroughly blended into a homogeneous composition. The composition was spread to a thickness of 0.2 mm and exposed for 1.0 second to a 80-watt metal halide lamp at a lamp-to-film spacing of 10 cm in a nitrogen atmosphere, obtaining a film having rubbery elasticity. Little sulfur odor due to a mercapto radical was perceived during the series of working steps. The composition of organopolysiloxanes (I) and (II) showed greatly improved workability as compared with a prior art composition using a conventional mercaptoalkyl radical-containing polysiloxane instead of organopolysiloxane (I).

EXAMPLE 2

To 9 parts of organopolysiloxane (III) having the following average formula:

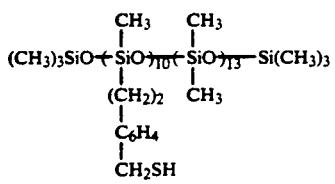

prepared by the same process as in Example 1 was evenly added 100 parts of vinyl-containing organopolysiloxane (IV) having the following average formula:

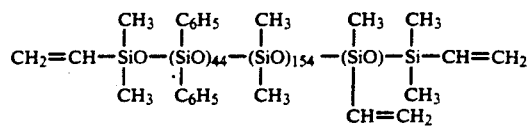

After 2 parts of the same photopolymerization initiator as used in Example 1 was added to the mixture, the mixture was thoroughly blended into a homogeneous composition. The composition was worked and cured as in Example 1, obtaining a film having rubbery elasticity. Lesser sulfur odor was perceivable during and after the working steps than with prior art compositions.

EXAMPLE 3

A reactor vessel as used in Example 1 was charged with 5 grams of conc. hydrochloric acid and 5 grams of water. With stirring, 20 grams of a 50% toluene solution of an organosilane of the following structural formula:

$$HSCH_2C_6H_4SiCH_3(OCH_3)_2$$

was added dropwise to the reactor. At the end of addition, the reaction solution was subjected to successive steps as in Example 1 including decantation, water washing, azeotropic dewatering, filtration, and solvent stripping. There was obtained an organopolysiloxane (V) having the average formula:

$$[CH_3Si(C_6H_4CH_2SH)O]_n$$

wherein n is a mixture of 3 and 4.

To 10 parts of organopolysiloxane (V) were evenly added 65 parts of organopolysiloxane (VI) having the following average formula:

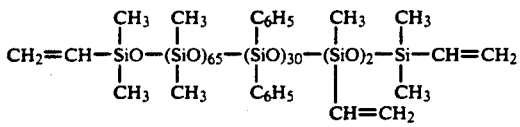

and 35 parts of organopolysiloxane (VII) having the following average formula:

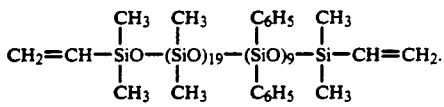

After 1 part of 1-benzoyl-1-hydroxycyclohexane was added to the mixture as a photopolymerization initiator, the mixture was thoroughly blended into a homogeneous composition.

The composition was worked and cured through UV exposure as in Example 1, obtaining a film having rubbery elasticity. Lesser sulfur odor was perceivable during and after the working steps than with prior art compositions.

EXAMPLE 4

A reactor vessel as used in Example 1 was charged with 2.5 grams of conc. hydrochloric acid, 2.5 grams of water, and 30 grams of toluene. With stirring, a 40% toluene solution containing 6.8 grams of an organosilane of the structural formula:

$HSCH_2C_6H_4CH_2CH_2Si(OCH_3)_3$.

7.5 grams of phenyltrimethoxysilane, and 15 grams of dimethyldimethoxysilane was added dropwise to the reactor. The reaction solution was heated for 12 hours under reflux with stirring, and then subjected to successive steps as in Example 3. There was obtained an organopolysiloxane (VIII) having the following average formula.

$[(CH_3)_2SiO]_{10}[HSCH_2C_6H_4CH_2CH_2SiO_{3/2}]_2(C_6H_5SiO_{3/2})_3$

To 17 parts of organopolysiloxane (VIII) was evenly added 80 parts of organopolysiloxane (IX) having the following average formula:

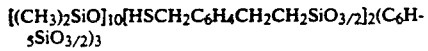

After 1.2 parts of the same photopolymerization initiator as in Example 1 was added to the mixture, the mixture was thoroughly blended into a homogeneous composition.

The composition was worked and cured through UV exposure as in Example 1, obtaining a film having rubbery elasticity. Lesser sulfur odor was perceivable during and after the working steps than with prior art compositions.

EXAMPLE 5

An organopolysiloxane composition was obtained by evenly blending 400 parts of a dimethylpolysiloxane having

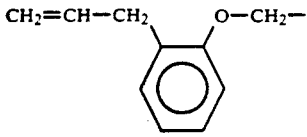

groups at its molecular chain ends and having a viscosity of 400 centistokes at 25° C., 108.8 parts of a mercapto-containing dimethylpolysiloxane having the average molecular formula:

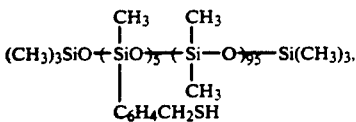

and 5 parts of benzoin isobutyl ether.

COMPARATIVE EXAMPLE 1

An organopolysiloxane composition was obtained by evenly blending 400 parts of a dimethylpolysiloxane having vinyl groups at its molecular chain ends and having a viscosity of 400 centistokes at 25° C., 108.8 parts of the same mercaptopropyl-containing dimethylpolysiloxane of formula (a) as in Example 5, and 5 parts of benzoin isobutyl ether.

COMPARATIVE EXAMPLE 2

An organopolysiloxane composition was obtained by the same procedure as in Comparative Example 1 except that the dimethylpolysiloxane having vinyl groups at its molecular chain ends was replaced by a dimethylpolysiloxane having allyl groups.

EXAMPLE 6

An organopolysiloxane composition was obtained by evenly blending 400 parts of a methylphenylpolysiloxane having

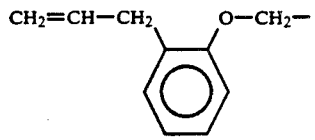

groups at its molecular chain ends and having a viscosity of 2500 centistokes at 25° C. (phenyl content 25 mol %), 20 parts of a mercapto-containing polysiloxane having the average molecular formula:

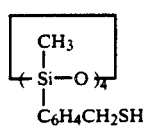

and 5.5 parts of Irgacure 500. Irgacure 500 is a trade name of a photopolymerization initiator mixture of

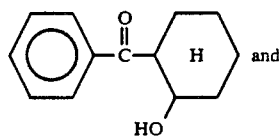
and
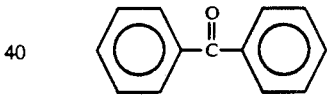

in a 50/50 molar ratio manufactured by Nihon Ciba Geigy K.K.

COMPARATIVE EXAMPLE 3

An organopolysiloxane composition was obtained by evenly blending 400 parts of a methylphenylpolysiloxane having vinyl groups at its molecular chain ends and having a viscosity of 2500 centistokes at 25° C., 20 parts of the same mercaptopropyl-containing polysiloxane of formula (b) as in Example 6, and 5.5 parts of Irgacure 500 photopolymerization initiator.

COMPARATIVE EXAMPLE 4

An organopolysiloxane composition was obtained by the same procedure as in Comparative Example 3 except that the methylphenylpolysiloxane having vinyl groups at its molecular chain ends was replaced by a methylphenylpolysiloxane having allyl groups.

The UV reactive organopolysiloxane compositions of Examples 5-6 and Comparative Examples 1-4 was spread and exposed to UV radiation for 1 second under a 80-watt high pressure mercury lamp at a spacing of 10 cm, obtaining cured sheets of about 0.6 mm thick. During the series of steps, little sulfur order due to mercapto radicals was perceivable in the compositions of Examples 5-6, indicating substantial improvements in working over Comparative Examples 1-4. The sheets were placed in a sunshine weatherometer (manufactured by Toyo Seiki K.K.) for a degradation test.

The degree of degradation was evaluated by measuring the amount of extract with MEK (methyl ethyl ketone) before the degradation test (initial) and after 24 hours from the start of the test.

The results are shown in Tables 1 and 2.

TABLE 1

Examples Using Dimethylpolysiloxane

| Example | MEK extract amount (%) | |
|---|---|---|
| | Initial | After 24 hours |
| Example 5 | 11 | 8 |
| C.E. 1 | 8 | UM* |
| C.E. 2 | 7 | UM* |

*unmeasurable because the sample could not retain the initial shape.

TABLE 2

Examples Using Methylphenylpolysiloxane

| Example | MEK extract amount (%) | |
|---|---|---|
| | Initial | After 24 hours |
| Example 6 | 27.8 | 24.2 |
| C.E. 3 | 24.8 | 45 |
| C.E. 4 | 25.1 | 48 |

Although some preferred embodiments have been described, many modifications and variations may be made thereto in the light of the above teachings. It is therefore to be understood that within the scope of the appended claims, the invention may be practiced otherwise than as specifically described.

We claim:

1. An organopolysiloxane composition comprising:
(A) an organopolysiloxane having per molecule at least two units of the general formula (1)

wherein
- $R^1$ is a monovalent organic radical having 1 to 6 carbon atoms without an aliphatic unsaturated bond,
- letter a is a number selected from the group consisting of 0, 1 and 2,
- m is a number selected from the group consisting of 1, 2 and 3, and
- n is a number selected from the group consisting of 0, 1 and 2, and (B) an organopolysiloxane having per molecule at least two units of the general formula (2)

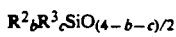

wherein $R^2$ is a

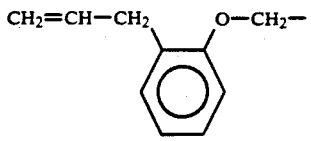

radical,
- $R^3$ is a monovalent organic radical having 1 to 6 carbon atoms without an aliphatic unsaturated bond,
- letter b is a number selected from the group consisting of 1, 2 and 3, and
- c is a number selected from the group consisting of 0, 1 and 2, with the sum of b and c being equal to 1, 2 or 3.

2. The composition of claim 1 wherein component (A) includes in addition to the units of formula (1) at least one unit having the formula:

wherein $R^4$ is a monovalent hydrocarbon radical having 1 to 6 carbon atoms and letter d is a number equal to 0, 1, 2 or 3, and component (B) includes in addition to the units of formula (2) at least one unit having the formula:

wherein $R^5$ is a monovalent hydrocarbon radical having 1 to 6 carbon atoms and letter e is a number equal to 0, 1, 2 or 3.

3. A cured product obtained by curing an organopolysiloxane composition as set forth in claim 2.

4. The composition of claim 1 wherein the mercapto- and phenylene-containing substituent in formula (1), represented by $HS(CH_2)_mC_6H_4(CH_2)_n$, is selected from the group consisting of

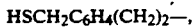

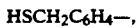

, and

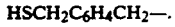.

5. A cured product obtained by curing an organopolysiloxane composition as set forth in claim 4.

6. An organopolysiloxane composition as recited in claim 1, wherein component (A) of said composition contains 0.5 to 5 mercapto radicals per each aliphatic unsaturated bond in component (B) of said composition.

7. A cured product obtained by curing an organopolysiloxane composition as set forth in claim 1.

* * * * *